United States Patent [19]
Pamler

[11] Patent Number: 4,573,816
[45] Date of Patent: Mar. 4, 1986

[54] ELASTIC BEARINGS FOR SHAFTS
[75] Inventor: Gerhard Pamler, Nuremberg, Fed. Rep. of Germany
[73] Assignee: Triumph-Adler A.G. fur Buro- und Informationstechnik, Nuremberg, Fed. Rep. of Germany
[21] Appl. No.: 613,269
[22] Filed: May 24, 1984
[30] Foreign Application Priority Data
Jul. 13, 1983 [DE] Fed. Rep. of Germany ....... 3325279
[51] Int. Cl.⁴ .......................... F16C 27/06; B41J 11/04
[52] U.S. Cl. ..................................... 400/661; 101/348; 384/220; 400/641
[58] Field of Search ................ 384/220, 222; 400/641, 400/661, 689; 101/348

[56] References Cited
U.S. PATENT DOCUMENTS

| 1,731,958 | 10/1929 | Wickstrom | 384/220 |
| 2,465,785 | 3/1949 | Berno | 384/222 |
| 2,802,417 | 8/1957 | Forbes | 101/348 |
| 2,897,027 | 7/1959 | Sutowski | 384/220 |
| 3,171,699 | 3/1965 | Maxey | 308/26 |
| 3,353,879 | 11/1967 | Jorn | 384/222 |
| 3,382,017 | 5/1968 | Cripe | 384/222 |
| 3,942,314 | 3/1976 | Olowinski | 384/220 |
| 4,247,213 | 1/1981 | Wurscher | 400/661 |

FOREIGN PATENT DOCUMENTS

| 747847 | 10/1944 | Fed. Rep. of Germany | 384/220 |
| 1257429 | 2/1961 | France | 384/220 |
| 597881 | 2/1948 | United Kingdom | 384/220 |

Primary Examiner—Clyde I. Coughenour
Attorney, Agent, or Firm—Joseph R. Spalla

[57] ABSTRACT

Elastic bearings supporting bearing bushings for shafts are mounted in recesses in plates of a machine frame. The elastic material is shaped so that, in at least one predetermined direction transverse to the longitudinal axis of the shaft, its dimension is a multiple of that in other directions. What is achieved thereby is that the shaft is constrained to move in one defined direction only.

5 Claims, 3 Drawing Figures

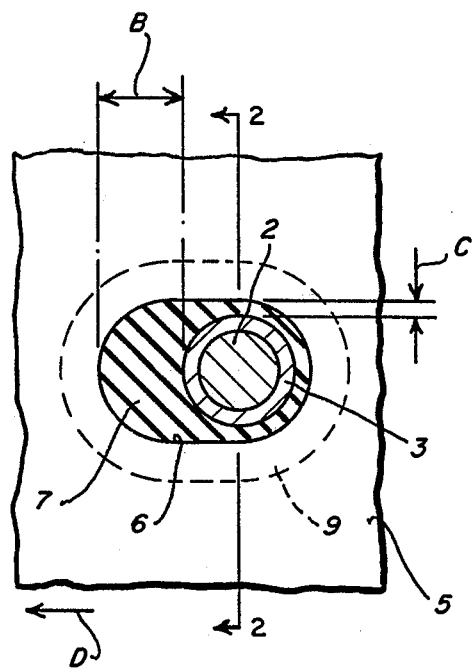
Fig_1
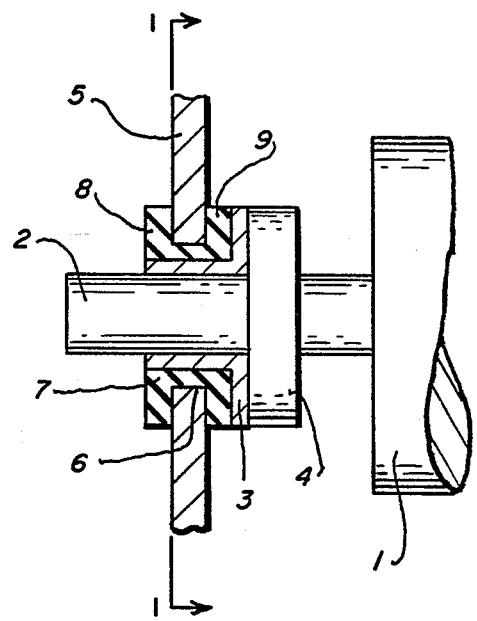
Fig_2
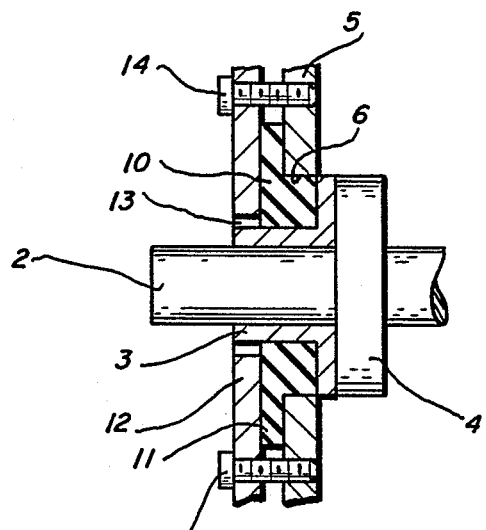
Fig_3

ELASTIC BEARINGS FOR SHAFTS

This invention relates to elastic bearings for shafts mounted in recesses in plates of a machine frame wherein the elastic material of the bearing is provided between shaft bearing bushings and the plates.

BACKGROUND OF THE INVENTION

DE-AS 24 37 454, corresponding to U.S. Pat. No. 4,247,213, and DE-PS 657 021 disclose elastic bearings for shafts of typewriter platens. Such elastic bearings serve to reduce noises occurring due to the reproduction of characters by cushioning and insulating against noise transfer from the platen to the machine frame. If the elastic material of the prior art bearings is too soft, the platen shaft will oscillate resulting in irregular reproduction of printed characters. If on the other hand the elastic material is too hard, a part of the advantage is lost. Where the chosen elastic material results in oscillation, the oscillation may occur in an undesirable direction. For example oscillations in a vertical direction caused by vibrations occurring in the machines can cause an uneven line of printed characters.

An object of the invention to provide an elastic bearing for shafts which contrains oscillations of the shaft essentially to one preferred direction only.

Another object of the invention is in the provision of an elastic bearing wherein the shape of the elastic material is chosen to insulate noise transfer while controlling oscillating behavior of the shaft essentially to one direction.

Another object of the invention is to provide an elastic bearing which is of simple design and easily assembled.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

FIG. 1 is a cross sectional view taken along lines 1—1 of FIG. 2 of the elastic bearing of the invention mounted in a machine side plate;

FIG. 2 is a vertical cross sectional view taken along line 2—2 of FIG. 1, and

FIG. 3 is a cross sectional view similar to that of FIG. 2 illustrating a second embodiment of the invention.

Referring now to the drawing wherein like reference numerals designate like or corresponding parts throughout the several views there is shown in FIGS. 1 and 2 a platen assembly comprising a cylindrical platen 1 and trunions 2 which may be secured to the end faces of the platen or be the ends of a common shaft extending through the platen 1. The trunions 2 are received in cylindrical bearing bushings 3. Axial shifting of the trunions 2 is avoided by means of collars 4 secured to the trunions 2. In opposite side plates 5 which may be machine side frames holes 6 are provided. The holes 6 are generally oval or ellipsoid shape with the long dimension extending horizontally transverse the axis of the platen 1. Inserted in the holes 6 are complimentary shaped noise buffers 7 of elastic material such as rubber. In the embodiment according to FIGS. 1 and 2 the buffers 7 have inner and outer flanges 8 and 9 which embrace the side plates 5 defining the holes 6. As shown in FIG. 1 the bushings 3 for supporting the trunions 2 are located in holes in the noise buffers 7 at the forward ends of the noise buffers 7. As shown in FIG. 2 the bearing bushings are formed with a flange which with the inner side of plate 5 sandwiches the inner flange 9 of the noise buffers 7.

In the embodiment shown in FIG. 3, the trunions 2 are also mounted in bearing bushings 3 mounted within noise buffers 10. As in FIG. 2 collars 4 fix the axial position of the platen 1. In this embodiment the noise buffers 10 are provided only with an outer flange 11 abutting the plate 5. A pressure plate 12 with a center hole 13 is mounted on the outer side of the flange 11 and screwed to the plate 5 such as by screws 14.

It may be seen from FIG. 1 that the dimension B of the elastic material of noise buffers 7 on the rearward end or to the left as viewed in FIG. 1 is a multiple of the dimension, e.g. in direction C. What this achieves is that the trunions 2, due to the greater aggregation of elastic material of the noise buffers 7 of 10 (FIG. 3), can compress the material more easily in the direction of arrow D than, e.g., in the opposite direction, or up and down. If such a bearing is used, for instance, to mount a platen 1 in a typewriter, the upshot is that the platen 1 can consist of hard materials, for instance, it being known that harder platen material means better character reproductions. Moreover, the platen 1 itself can be produced in this case more easily and cheaply than is normally the case. It is possible also to provide the greater aggregation of elastic material also in a different direction, deviating from the arrangement according to FIG. 1.

In the bearing shown in FIG. 3, the elasticity may be adjustable within certain limits by tightening the screws 14 more or less. It is important for the center hole 13 in the pressure plate 12 to be big enough so that the bearing bushing 3 cannot strike it.

According to other embodiments not shown, it is also possible to design the aggregation of elastic material comprising the noise buffers 7 or 10 around the bearing bushing 3 differently. For example, a greater aggregation of elastic material opposite to the direction of arrow D in FIG. 1 could be provided for. This could be of advantage in other applications for the elastic bearing.

While meeting the object of the invention the essential advantage of elastic bearings, namely the avoidance of the transfer of sound waves to the machine frame, is not lost due to arrangement according to the invention. As is evident from the drawing, an elastic bearing according to the invention is also easy to produce and assemble. The elastic material of the noise buffers 7 or 10 may be rubber, for instance, or a material resembling rubber. Depending on the bearing application, the desired material elasticity should be specified.

The elastic bearing described can be used, for example, to mount platens in typewriters, printers or similar equipment. It is also possible to use the bearing for shafts in which problems similar to those in typewriters occur.

The invention claimed is:

1. Apparatus for mounting the trunions of a printing machine platen to constrain oscillations resulting from type character impacts thereagainst essentially to a predetermined direction only comprising, machine side frames having generaly non-circular openings having their longest dimension extending in said predetermined direction, complimentary shaped elastic noise buffers mounted in said frame openings, and trunion bushings mounted in openings through and adjacent one end of said buffers so that the dimension of the buffers relative to the trunion axis in said predetermined direction is a multiple of the dimensions in other directions such that oscillations are constrained essentially to said predetermined direction.

2. Apparatus as recited in claim 1, said side frame openings and noise buffers having oval shapes with the long dimension extending horizontally and transverse the axis of said trunions.

3. Apparatus as recited in claim 1, said buffers having inner and outer flanges surrounding the inner and outer sides of said side frames defining said openings.

4. Apparatus as recited in claim 1, said buffers having a single flange adjacent the outer side of said side frames, and a compression plate secured to said side plates for compressing said flange therebetween.

5. Apparatus as recited in claim 1, said elastic noise buffers comprising a single formed piece.

* * * * *